2. Sheets, Sheet 1.

Bradshaw. Brown & Whitehead,

Treadle.

No. 4,233. Reissued Jan. 17. 1871.

N. PETERS, PHOTO-LITHOGRAPHER, WASHINGTON, D. C.

Bradshaw Brown & Whitehead. 2. Sheets Sheet 2.

Treadle.

No. 4,233. Reissued Jan. 17, 1871.

Inventors
John A Bradshaw
Wm H Brown
Darius Whitehead

Witnesses
Frank O. Butterfield
Chas. A. F. Brown

N. PETERS, PHOTO-LITHOGRAPHER, WASHINGTON, D. C.

UNITED STATES PATENT OFFICE.

JOHN A. BRADSHAW, WILLIAM H. BROWN, AND DARIUS WHITHED, OF LOWELL, MASSACHUSETTS.

IMPROVEMENT IN TREADLES FOR SEWING-MACHINES.

Specification forming part of Letters Patent No. 92,786, dated July 20, 1869; Reissue No. 4,233, dated January 17, 1781.

*To all whom it may concern:*

Be it known that we, JOHN A. BRADSHAW, WILLIAM H. BROWN, and DARIUS WHITHED, all of Lowell, in the county of Middlesex and State of Massachusetts, have invented new and useful Improvements in Sewing-Machines; and we do hereby declare that the following is a full and exact description thereof, reference being had to the accompanying drawings, and to the letters of reference marked thereon.

The nature of our invention consists in providing for sewing-machines a device whereby a rotary motion is transmitted to the same by means of segment gears, pawls, and ratchets, without the aid of a crank and pitman.

It also relates to the arrangement and combination of the adjustable casters, whereby the same may be applied and adjusted, and by which, when to be removed, the machine is rendered portable, and when in use rendered fixed or stationary.

To enable others skilled in the art to make and use our invention, we will proceed to describe its construction and operation.

Figure 1:
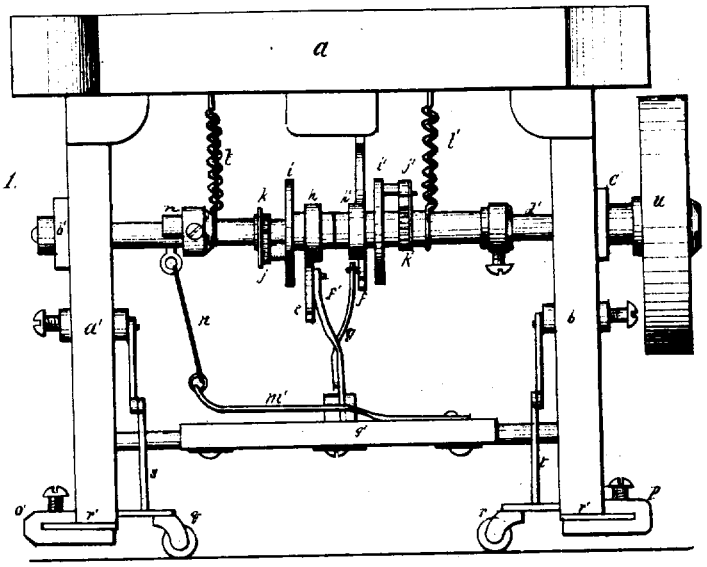
Figure 2:
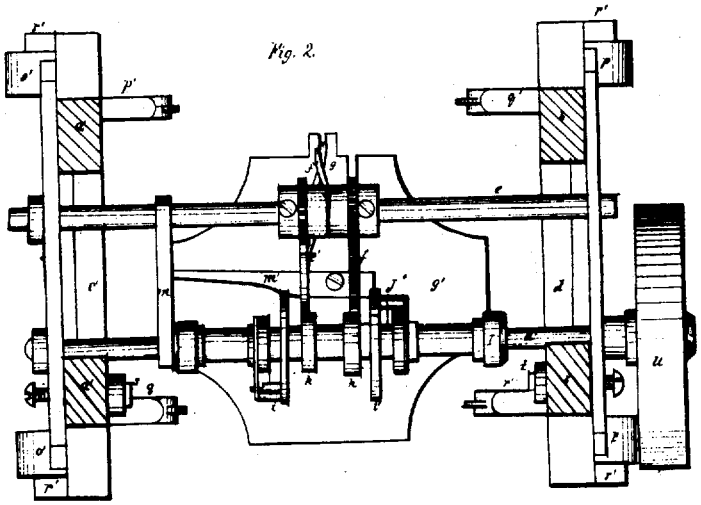
Figure 3:
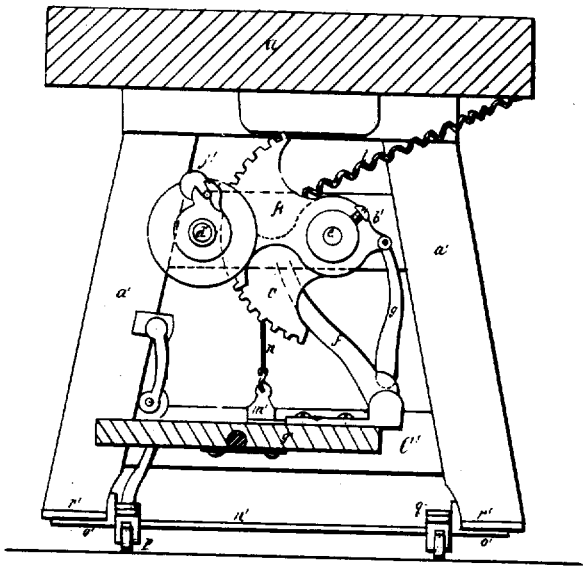
Figure 4:
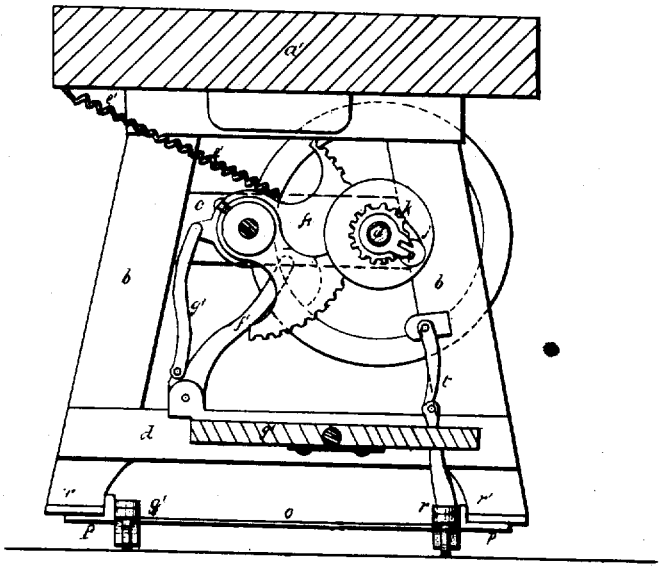

Figure 1 represents a front elevation of a sewing-machine frame or stand with our improvements attached. Fig. 2 represents a plan of the same with the top of the machine removed. Fig. 3 represents a vertical section of the same, showing the working parts on the opposite side from the driving-pulley. Fig. 4 represents a vertical section of the same, showing the working parts on the driving side of the machine.

Similar letters in the different figures indicate corresponding parts.

*a a* represent the top of the sewing-machine frame, which is provided with legs *a'* and *b*, they being secured to the same and located on each side. Secured to these legs *a'* and *b* are the girts *b'*, *c*, *c'*, and *d*, which are parallel with the top *a* of the sewing-machine. Formed in the top girts, *b'* and *c*, are bearings for the reception of the driving-shaft *d'* and stud-shaft *e*, which is located back of the same, and on which shaft *e* are the segment-gears *e'* and *f*, they being held in position by means of the requisite collars, allowing them to turn freely on the shaft *e*. Attached to these segment-gears *e'* and *f* are the treadle-rods *f'* and *g*, their lower ends being pivoted together and connect with the treadle *g'*, this treadle *g'* being provided with a shaft or stud, which is mounted in bearings formed in the girts *c'* and *d*. The treadle-rod *g* is pivoted to an offset in the treadle-rod *f'*, on one side thereof, and the two rods are then crossed and pivoted, the rod *g* to a short arm extending out from the segment *f*, in rear of the fulcrum-shaft *e*, and the rod *f'* to the middle portion of the segment *e'*, in front of the fulcrum-shaft.

*h* and *h'* are loose pinions, to which are connected the collars *i* and *i'*, which play freely on the shaft *d'* and gear into the segment-gears *e'* and *f*. Secured to the outside of these collars *i* and *i'* are the requisite pawls *j* and *j'*, which work in their respective ratchets *k* and *k'*, they being firmly secured to the shaft *d'*.

*l* and *l'* are friction-springs, which furnish the ratchets *k* and *k'* with the requisite friction, preventing the same from turning backward.

*m* is a saddle which sits on the shafts *d'* and *e*, connecting with the foot stop-motion *m'* by means of the connecting rod or strap *n*.

*n'* and *o* are the caster plates or rods, which are pivoted at each end to the adjustable slides *o' o'* and *p p*. On the top of these plates *n'* and *o*, near each end, are pivoted the casters *p'*, *q q'*, and *r*, these slides *o' o'* and *p p* operating on the plates *r' r' r' r'*, which are firmly secured to the bottom of the legs *a'* and *b*.

*s* and *t* are toggle-joints which connect with the caster-plates *n'* and *o* and legs *a'* and *b*.

*u* is a balance-wheel, which is secured to the shaft *d'*, it being located on the outside of the legs *b b*, which acts as a balance and driving wheel to the sewing-machine, transmitting power to the same.

The machine being thus constructed and its several parts adjusted in position, and the other devices which constitute the entire sewing-machine being located as required, is then ready for use, motion being transmitted from the driving-pulley or balance-wheel *u* to the driven pulley on the machine. The operator, by giving the treadle *g'* an alternate motion, produces corresponding motion to the segment-gears *e'* and *f* by the aid of the treadle-straps *f'* and *g*. These segment-gears *e'* and *f*, gearing into the loose pinions $h$ and $h'$, produce the same alternate motion in them, which, by the aid of the collars $i$ and $i'$, with their pawls $j$ and $j'$ attached, operates the ratchets $k$ and $k'$ inversely with each other—that is, when the pawl $j$ is engaged in the ratchet $k$ the pawl $j'$ is disengaged from the ratchet $k'$, and vice versa—and the springs $l$ and $l'$, acting in concert with their respective ratchets $k$ and $k'$, give the required friction to the same, preventing any backward movement of them under any circumstances. This alternate operation of the pawls $j$ and $j'$ upon the ratchets $k$ and $k'$ gives a continual, continuous, and uniform rotary motion to the driving-shaft $d'$ as long as power is applied to the treadle $g'$ by the operator.

When the machine is required to be stopped for any purpose, the operator, by the aid of the saddle $m$, acting upon the shaft $d'$ by means of the stop-motion $m'$ and connecting-rod $n$, depressing the same, is enabled so to do easily and suddenly, and the machine, when stopped in any position, is in condition to be started by the operator without being obliged to start the same with the assistance of the hand, as there are no dead-points to overcome, as there always is with the use of the crank and pitman; and, further, the machine is rendered portable at a moment's notice by aid of the caster-plates $n'$ and $o$, with casters $p$, $q$ $q'$, and $r$, operated upon by the toggle-joints $s$ and $t$, which raise the machine from the floor and rest it upon the casters $p'$, $q$ $q'$, and $r$, and the machine is made stationary by elevating the caster-plates $n'$ and $o$, with casters $p'$, $q$ $q'$, and $r$, by aid of the toggle-joints $s$ and $t$, thus allowing the machine to rests firmly on the floor.

Thus it will be seen that with our improvements attached to sewing-machines the operator is enabled to produce a steady, easy, uniform motion of any required speed, superseding the necessity of the use of the crank and pitman, having no dead-points to overcome, and the machine, under all and any circumstances, can be started by the foot without being obliged to remove the hands from the work to assist, making a compact, reliable, durable, portable or stationary machine.

What we claim as our invention, and desire to secure by Letters Patent, is—

1. The arrangement of the treadle $g'$ and the rods $g$ and $f'$, when attached to the segment-gear $f$ and $e'$, respectively, the one in rear and the other in front of the fulcrum-shaft, substantially as specified.

2. The arrangement of the segment-gears $e'$ and $f$, ratchets $k$ and $k'$, pawls $j$ and $j'$, substantially as herein described and specified.

3. The caster plates or rods $r$ and $o$, with casters $p'$, $q$ $q'$, and $r$, when arranged in reference with each other and operated substantially as herein described and specified.

4. The adjustable slide $o'$ $o'$ and $p$ $p$, in combination with the caster-plates $n'$ and $o$, for the purposes as specified.

JOHN A. BRADSHAW.
WM. H. BROWN.
DARIUS WHITHED.

Witnesses:
FRANK O. BUTTERFIELD,
CHAS. A. F. SWAN.